United States Patent [19]
Kass et al.

[11] Patent Number: 5,647,603
[45] Date of Patent: Jul. 15, 1997

[54] SPRING BAR WITH INTEGRAL HANGER

[75] Inventors: John J. Kass; Richard McCoy, both of Granger, Ind.

[73] Assignee: Reese Products, Inc., Elkhart, Ind.

[21] Appl. No.: 568,770

[22] Filed: Dec. 7, 1995

Related U.S. Application Data

[63] Continuation of Ser. No. 546,385, Oct. 20, 1995.

[51] Int. Cl.⁶ .................................................. B60D 1/42
[52] U.S. Cl. ........................... 280/406.1; 280/484
[58] Field of Search ........................... 280/406.2, 406.1, 280/405.1, 483, 484, 455.1

[56] References Cited

U.S. PATENT DOCUMENTS

| | | | |
|---|---|---|---|
| 3,194,584 | 7/1965 | Reese | 280/406.2 |
| 3,206,224 | 9/1965 | Bock et al. | 280/406.2 |
| 3,520,556 | 7/1970 | Warner | 280/406.2 |
| 3,552,771 | 1/1971 | Hendricks | 280/406.2 |
| 3,600,004 | 8/1971 | Newkirk | 280/406.2 X |
| 3,731,950 | 5/1973 | Burcham | 280/406.2 |
| 4,211,427 | 7/1980 | Young et al. | 280/406.2 |
| 4,253,680 | 3/1981 | Albright et al. | 280/406.2 X |
| 4,679,812 | 7/1987 | Byrnes | 280/406.2 |
| 5,375,867 | 12/1994 | Kass et al. | 280/457 |

*Primary Examiner*—Kevin Hurley
*Attorney, Agent, or Firm*—King & Schickli

[57] ABSTRACT

A spring bar for a weight distributing hitch includes an elongated body carrying an integral hanger for securing to a trailer to be towed behind a towing vehicle. Preferably, the integral hanger is a lug with a cooperating retaining tab. The spring bar also includes a trunnion allowing cantilever mounting of the spring bar to a ball mount head of a trailer hitch that is secured to a towing vehicle.

10 Claims, 3 Drawing Sheets

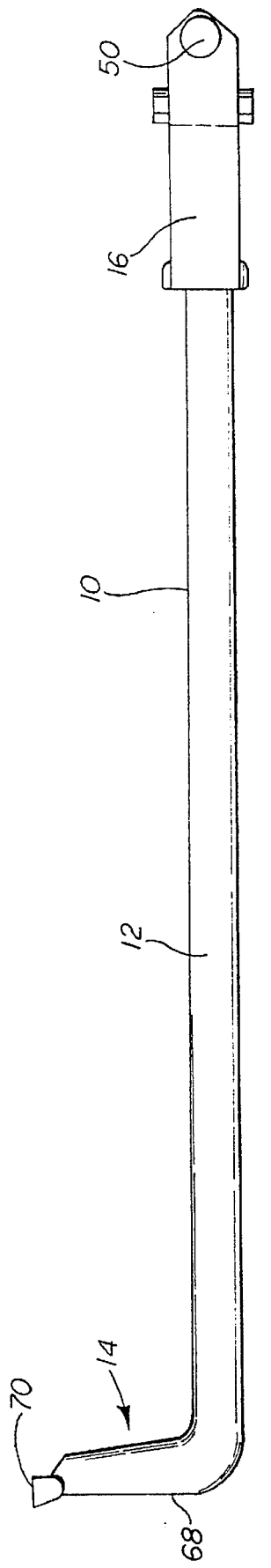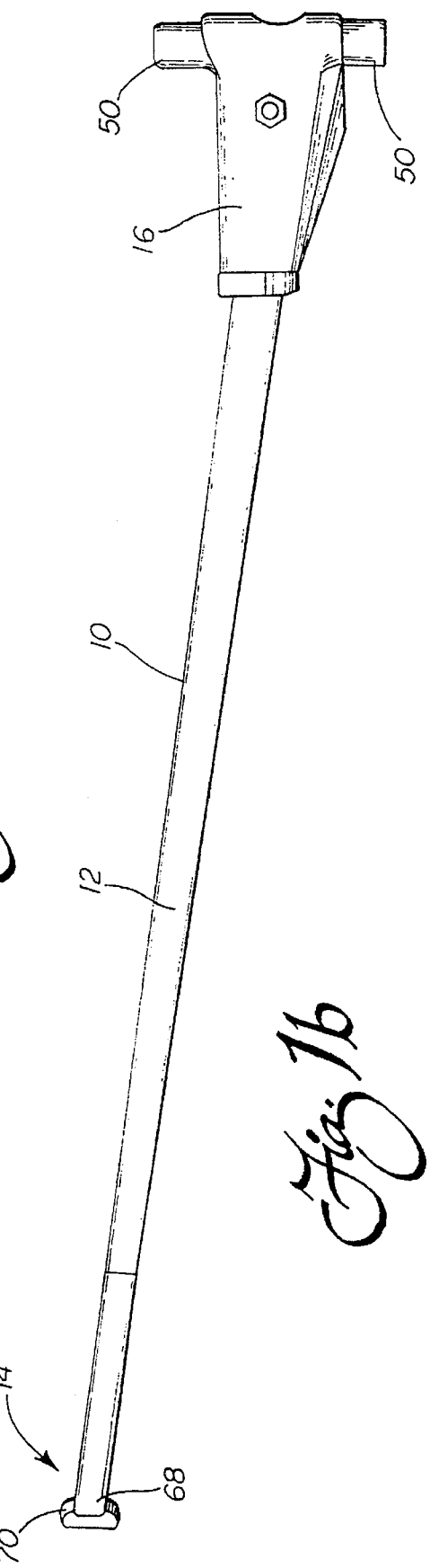

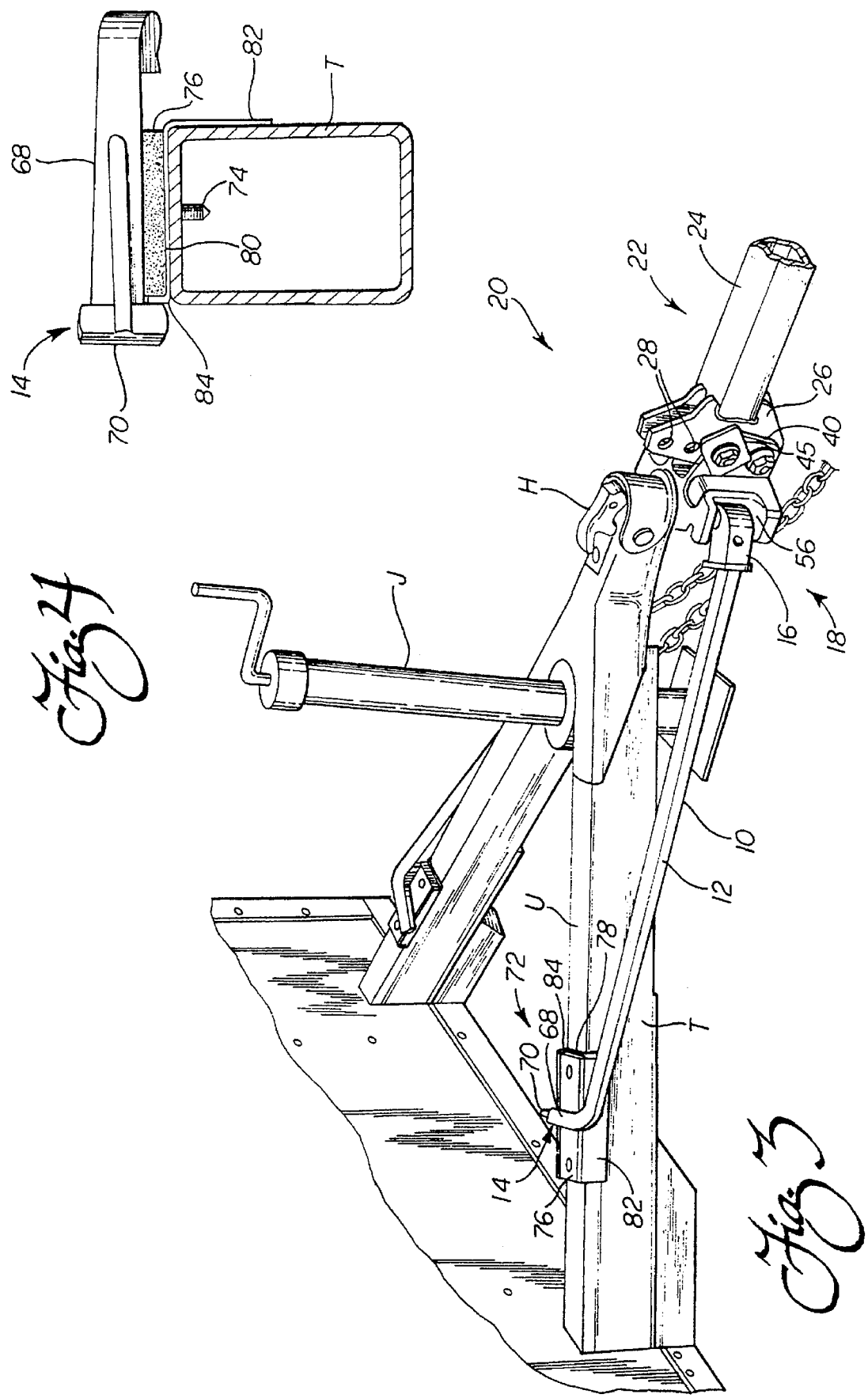

SPRING BAR WITH INTEGRAL HANGER

This is a continuation of U.S. patent application Ser. No. 08/546,385, filed Oct. 20, 1995 pending, and entitled "Hitch Having Spring Bars With Integral anger".

TECHNICAL FIELD

The present invention relates generally to the towing field and, more particularly, to an improved spring bar with an integral hanger for use on a weight distributing hitch assembly.

BACKGROUND OF THE INVENTION

Hitch assemblies for more evenly distributing the tongue weight of a trailer over the front and rear axles of a towing vehicle are well known in the art. A particularly advanced design of weight distributing hitch assembly is disclosed in the assignee's issued U.S. Pat. No. 5,375,872 to Kass et al. entitled "Weight Distributing Hitch". This hitch assembly includes a hitch bar for receipt in a receiver mounted to the vehicle and a ball mount head for mounting on the hitch bar at a selected tilt angle. A pair of spring bars are mounted at their proximal ends to the ball mount head. The distal ends of these spring bars are connected by means of cooperating lift units and chains to the frame of the trailer. Such state of the art lift units are exemplified by Reese Products, Inc. product number 21160 incorporating a body that is mounted to the trailer frame, a chain hook with pivoting locking lever and a safety pin for securing the chain hook and lever in an operative position. As is known in the art, the amount of leveling or load transfer to the front axle of the vehicle is adjusted by engaging different links of the chains with the chain hooks of the lift units.

While such an arrangement is effective for its intended purpose, the lift units must be properly mounted to the trailer frame and the proper chain links engaged in the chain hooks in order to provide proper operation and a desired distribution of weight. While relatively simple, these procedures require some time to complete and may frustrate and annoy certain impatient individuals. Accordingly, a need is identified for a weight distributing hitch assembly allowing even greater ease and convenience of installation and operation. This is particularly true with respect to the connection of the distal end of the spring bars to the trailer frame in order to provide the weight distributing action.

SUMMARY OF THE INVENTION

Accordingly, it is a primary object of the present invention to provide spring bars of an improved design for use in a weight distributing hitch assembly especially adapted for towing a trailer behind a vehicle.

Another object of the present invention is to provide a spring bar for a weight distributing hitch assembly having a unique structure that allows quick and convenient connection of the spring bar between the ball mount head and trailer frame.

Yet another object of the present invention is to provide a unique spring bar mounting system wherein each spring bar includes an integral lug for hanging onto or over the trailer frame. Further, the trailer frame may be equipped with friction pads for supporting the lugs thereon that provide added resistance to sliding movement of the spring bars relative to the trailer frame and, therefore, a measure of trailer sway control.

Additional objects, advantages and other novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

To achieve the foregoing and other objects, and in accordance with the purposes of the present invention as described herein, a new and improved spring bar is provided for use with an improved weight distributing hitch assembly for towing a trailer behind a vehicle. More specifically, a pair of spring bars are received in the ball mount head of the weight distributing hitch assembly and function to distribute the trailer weight relative to the axles of the towing vehicle. Each of the pair of spring bars includes an elongated body having a proximal end that is mounted by means of a trunnion arrangement to the ball mount head and a distal end having a lug for engaging the frame of the trailer and securing the spring bar in an operative, weight distributing position bridging between the ball mount head and trailer frame.

Preferably, each of the spring bars is substantially L-shaped and each of the lugs includes a retaining tab. The retaining tab not only functions to secure the lug of the associated spring bar in a position on or overlying the trailer frame, but also provides a readily visible indicator of the proper positioning of the spring bar to the vehicle operator. Preferably, the spring bars are hot formed from steel or other appropriate high strength material so that the spring bar, lug and retaining tab are all of integral, one piece construction.

Still other objects of the present invention will become apparent to those skilled in this art from the following description wherein there is shown and described a preferred embodiment of this invention, simply by way of illustration of one of the modes best suited to carry out the invention. As it will be realized, the invention is capable of other different embodiments and its several details are capable of modification in various, obvious aspects all without departing from the invention. Accordingly, the drawings and descriptions will be regarded as illustrative in nature and not as restrictive.

BRIEF DESCRIPTION OF THE DRAWINGS

The accompanying drawing incorporated in and forming a part of the specification, illustrates several aspects of the present invention and together with the description serves to explain the principles of the invention. In the drawing:

FIG. 1a is a top plan view of a spring bar of the present invention;

FIG. 1b is a right side elevational view of the spring bar of FIG. 1a;

FIG. 3 is a perspective view showing the weight distributing hitch assembly operatively connected to a trailer with the spring bars engaging the trailer frame and in position to provide the desired weight distribution; and FIG. 4 is a detailed partially sectional view showing a spring bar lapped over a friction pad secured on the trailer frame.

Figure 2:
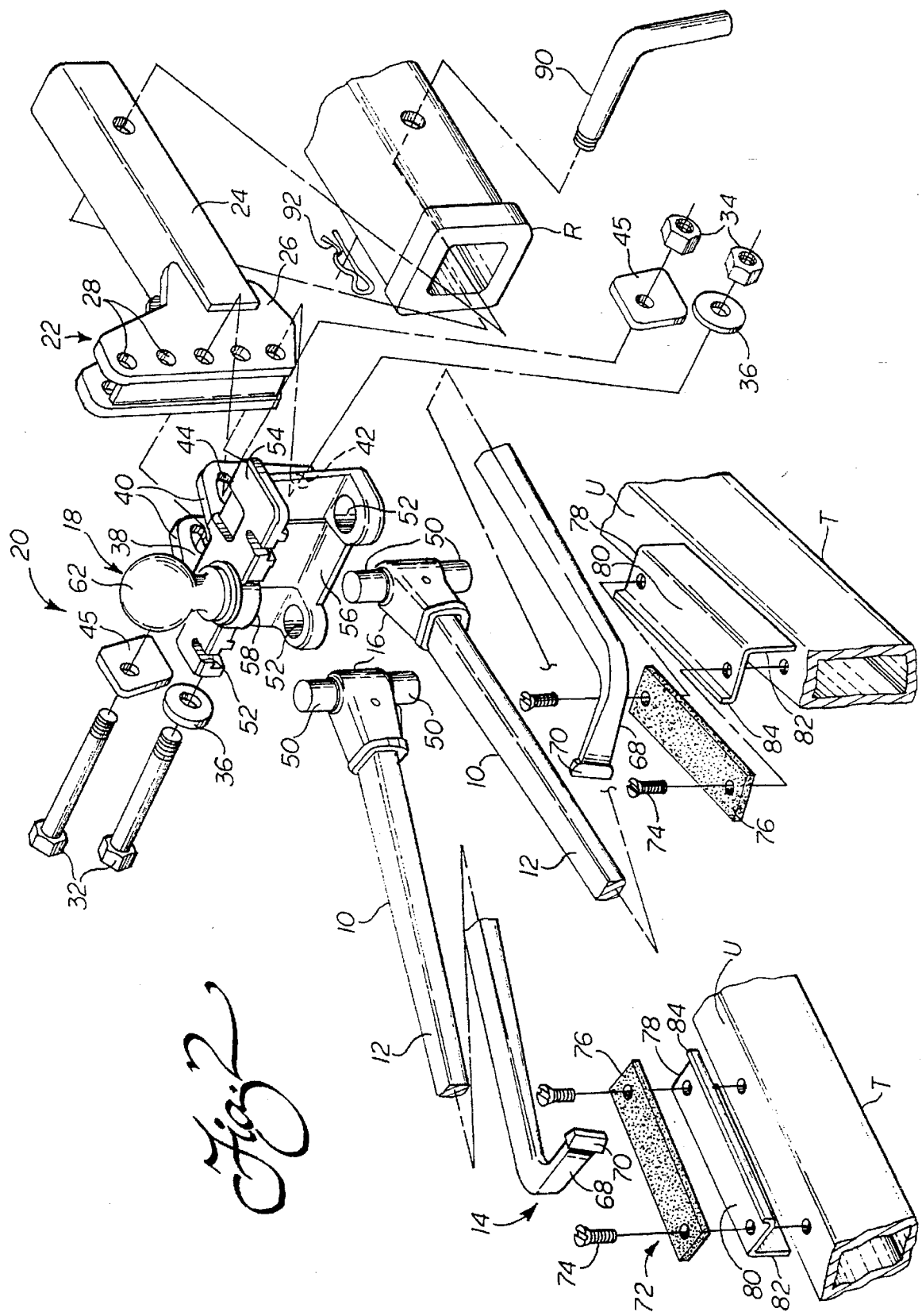
FIG. 2 is an exploded perspective view showing a pair of spring bars of the present invention with a complete weight distributing hitch assembly.

Reference will now be made in detail to the present preferred embodiment of the invention, an example of which is illustrated in the accompanying drawing.

DETAILED DESCRIPTION OF THE INVENTION

Reference is now made to FIGS. 1a and 1b showing the spring bar 10 of the present invention. The spring bar 10 includes an elongated body 12 having an integral hanger generally designated by reference numeral 14, at a distal end thereof. A means, such as a trunnion 16, may be carried on the proximal end of the elongated body 12 in order to allow the cantilevered mounting of the spring bar 10 to a ball mount head 18 of a weight distributing hitch assembly 20 of a type well known in the art (see also FIG. 2).

The weight distributing hitch assembly 20 includes a hitch bar 22 of a type known in the art having a tubular mounting post 24 for engagement in a receiver box R of a hitch receiver mounted to a vehicle (not shown). Such a hitch receiver is, for example, a Class II or III hitch receiver with two inch opening as manufactured by Reese Products, Inc. of Elkhart, Ind., the assignee of the present invention.

The distal end of the hitch bar 22 includes a split end mounting rack 26 having a series of aperture sets 28 allowing for height adjustment of the ball mount head 18. The ball mount head 18 may be a one-piece, integral construction cast from ductile iron. The ball mount head 18 is secured to the mounting rack 26 of the hitch bar 22 by means of two cooperating fasteners shown as bolts 32 and cooperating nuts 34. Lock washers 36 may be provided to insure the integrity of the connection.

More specifically the ball mount head 18 includes a substantially U-shaped spring bar mounting bracket 38 and a pair of spaced, parallel mounting flanges 40 so as to form a yoke adapted to receive the mounting rack 26. When properly mounted, the lower bolt 32 extends through the aligned cooperating apertures 42 (only one visible in FIG. 2) in the mounting flanges 40 and the one aligned aperture set 28 in the interdisposed mounting rack 26. Similarly, upper bolt 32 extends through an indexable, eccentric washer 45, the aligned cooperating arcuate slots 44 in the mounting flanges 40 and through a second aligned aperture set 28 in the interdisposed mounting rack 26. The arcuate slots 44 allow the ball mount head 18 to be pivoted relative to the hitch bar 22 about the lower bolt 32. Washers 36 are provided on the lower bolt 32 at each exposed side of the mounting flanges 40. Next, the bolts 32 and cooperating lock nuts 34 are then tightened. This arrangement allows the tilt angle of the ball mount head 18 to be selected by manipulation of the indexable, eccentric washer 45 in a manner described in detail in previously referenced U.S. Pat. No. 5,375,872 to Kass et al.

As further shown with reference to FIG. 2, the mounting bracket 38 includes an upper platform 54 having an aperture 58 for receiving a hitch connector such as hitch ball 62. The hitch ball 62 is secured in place by welding or other means known in the art.

As also shown in FIG. 2 and briefly described above, the weight distributing hitch assembly 20 includes a pair of spring bars 10. Each spring bar 10 carries a trunnion 16 (that may, for example, be bolted or pinned in place) at its proximal end for mounting in the ball mount head 18. More specifically, each mounting trunnion 16 includes a pair of oppositely disposed and outwardly projecting pivot pins 50. As is known in the art, the pivot pins on the trunnion 16 are received in a set of cooperating sockets 52 in the upper and lower legs or platforms 54, 56 of the ball mount head 18. A more detailed presentation of the trunnion connection of the spring bars 10 to the ball mount head 18 is presented in the assignee's co-pending U.S. patent application Ser. No. 08/319,908, filed on Oct. 7, 1994, entitled "Weight Distributing Hitch Assembly", the disclosure of which is fully incorporated herein by reference.

In accordance with an important aspect of the present invention, each spring bar 10 includes a lug 68 adjacent the distal end thereof that projects inwardly in a transverse direction at an included angle of 45°–135° and, more preferably, substantially 90°. Thus, as a result of the presence of the lug 68 the elongated body 12 of the spring bar 10 forms a substantially L-shape. As will be described in greater detail below, the lugs 68 allow the distal end of the spring bars 10 to be secured to the frame of the trailer T (see also FIG. 3) in a straightforward and convenient manner. This provides a desired ease of installation previously unknown in this art.

As further shown in FIGS. 2 and 4, each lug 68 includes an integrally depending retaining tab 70. The lug 68 and cooperating retaining tab 70 on each spring bar 10 are geometrically arranged so that each lug extends in a first plane and each retaining tab extends in a second plane substantially perpendicular to the first plane. As will be described in greater detail below, the retaining tab 70 allows one to visually confirm that an associated spring bar 10 has been properly connected to the frame of a trailer T to provide the desired weight distribution. Additionally, each retaining tab 70 functions to maintain the spring bar 10 associated therewith in proper position with the cooperating lug 68 overlying the upper surface U of the frame of the trailer T.

Further, it should be appreciated that each retaining tab 70 projects equally from the lug 68 in opposing directions. As a result, the elongated body 12 of the spring bar may be flipped 180° to reverse its orientation thereby allowing use on either the right or left hand side of the weight distributing hitch assembly 20. Accordingly, one part may serve two functions and production costs are thereby reduced. Of course, where necessary, the trunnion 16 may also be flipped 180° relative to the elongated body 12 in order to allow connection to the ball mount head 18.

So as to resist and control trailer sway often experienced when traversing undulating pavement and/or sweeping curves at highway speeds and thereby improve overall ride quality/trailer hitch performance, the weight distributing hitch assembly 20 may also include a pair of friction pad assemblies 72. Each friction pad assembly 72 is mounted to the upper surface U of the frame of the trailer T directly behind the trailer coupler socket H. In this position, one friction pad assembly 72 receives and supports each spring bar 10. The mounting of the friction pad assemblies 72 may be by any means known in the art including, for example, an adhesive or a fastener such as self-tapping screws 74 shown in FIG. 2.

Preferably, each friction pad assembly 72 includes a friction pad 76 formed from a high friction material, such as available from Friction Material Company under product designation NA104, and a supporting mounting bracket 78 preferably formed from a sheet metal such as steel. More specifically, the friction pad 76 is bonded to a first planar section 80 of the mounting bracket 78 so as to provide underlying support. Additionally, mounting bracket 78 includes a second planar section 82 that forms a substantially 90° included angle with the first planar section 80. Together, the sections 80, 82 define a mounting pocket for engaging the frame of the trailer T. Additionally, the mounting bracket 78 includes a projecting friction pad edge flange 84.

As described in greater detail below, the edge flange 84 serves several functions. The flange 84 protects the inwardly disposed edge of the friction pad 76 from being damaged by frictional engagement with the retaining tab 70 during towing. The flange 84 also engages the retaining tab 70 and functions as a guide when the associated spring bar 10 slides relative to the frame of the trailer T during towing. Thus, the spring bars 10 are maintained in position with the lugs 68 overlying the frame of the trailer T while resting upon the friction pads 76.

Advantageously, as should be appreciated from the above comments, the lugs 68 and retaining tabs 70 function as an integral spring bar hanger 14 that allows direct connection of the distal ends of the spring bars 10 to the frame of the trailer T (see FIG. 2). In use, the height of the forward end of the trailer T including the coupler socket H is adjusted up or down using the tongue jack J until the trailer is level. When level, the distance from the ground to the top of the coupler socket H is also measured. Next, the hitch bar 22 is inserted into the receiver box R and secured in place utilizing a pull pin 90 and clip 92 in accordance with a procedure well known in the art. Next, the ball mount head 18 is installed on the mounting rack 26 at a selected height so that the hitch ball 62 is nearest to the height of the coupler socket H. With the vehicle and trailer in line, the hitch socket H is placed on the hitch ball 62. The coupler latch is then closed to secure the trailer to the towing vehicle through the hitch assembly 20.

Next the tongue jack J is raised about 2–3 inches or more. From this position an individual may grasp an intermediate portion of the spring bar 10 adjacent the distal end thereof and swing the spring bar upwardly so that the lug 68 extends or projects over the top surface U of one of the frame rails of the trailer T. The friction pad assemblies 72 are then positioned on the upper surface U of the frame rails of the trailer T. More specifically, the friction pad assemblies 72 are positioned so that the lug 68 of each spring bar 10 is centered on one friction pad 76. The necessary holes are then drilled in the frame rails and the friction pad assemblies 72 are secured in position by means of the self-tapping screws 74.

Next, the tongue jack J is lowered in order to check the coupler H height. If the top of the coupler socket H is more than ½ inch lower than the original measurement, the tongue jack J is raised, and the spring bars 10 are disconnected from the frame rails of the trailer T. The tongue jack J is then lowered and the eccentric washer 45 is adjusted to index the ball mount head 18 to a new tilt angle. The tongue jack J is then again raised to allow installation of the spring bars 10 with the lugs 68 overlying the frame rails of the trailer T. The tongue jack J is then again lowered to check the coupler socket H height. Once proper height is established the ball mount nuts 34 are torqued to 85 lbft.

Advantageously, by simply positioning the spring bars 10 to hang by means of the integral lugs 68 from the trailer frame rails, one is able to operatively position the spring bars to provide the desired weight distributing action. This is a simple operation that may be completed in one movement to the utmost convenience and satisfaction of the user. There is no need to select a proper chain link or secure a lift bracket with a safety clip as required by state of the art lift units commonly utilized in this field.

Of course, it should be appreciated that not only is the weight distributing hitch assembly 20 equipped with the spring bars 10 of the present invention easier to use, it is a simpler structure that is less expensive to produce. The prior art lift brackets with their latch mechanism and chain link connection are eliminated and replaced with spring bars 10 having integral lugs 68 and the friction pads 76 that provide some added resistance to the sliding movement of the lugs 68 of the spring bars 10 relative to the frame of the trailer T as the trailer pivots about the hitch ball 62 during towing. As a result, any swaying motion imparted to the trailer during towing is resisted. Thus, the hitch assembly 20 equipped with the spring bars 10 of the present invention advantageously provides a measure of sway control previously unavailable in state of the art hitches equipped with standard spring bars, lift units and sway bar chain connectors. Consequently, the present invention represents a significant advance in design that achieves more than the prior art hitch designs. Further, this is accomplished by means of a simple structure that is less expensive to produce and more convenient and user friendly to utilize.

It should further be appreciated that the spring bars 10 may be hot formed from steel or other appropriate high strength material so that the elongated body 12 including hanger 14 (i.e. the lug 68 and retainer 70) are all of integral, one piece construction. Thus, the strength of the spring bar 10 is maximized and any unsightly welds or joints are eliminated. Accordingly, a more aesthetically pleasing product results.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally and equitably entitled.

We claim:

1. A spring bar for a weight distributing hitch assembly utilized to tow a trailer behind a towing vehicle, comprising:
    an elongated body having a proximal end and a distal end;
    means for mounting said spring bar to a ball mount head of said weight distributing hitch assembly, said mounting means being carried on said proximal end of said elongated body;
    a lug carried on a distal end of said elongated body and projecting therefrom so as to rest upon a frame member of said trailer, said lug projecting at an included angle of between substantially 45°–135°; and
    a retaining tab provided adjacent an end of said lug.

2. The spring bar set forth in claim 1, wherein said mounting means is a trunnion.

3. The spring bar set forth in claim 1, wherein said lug extends in a first plane and said retaining tab extends in a second plane substantially perpendicular to said first plane.

4. A spring bar for a weight distributing hitch assembly utilized to tow a trailer behind a towing vehicle, comprising:
    an elongated body having a proximal end and a distal end;
    means for mounting said spring bar to a ball mount head of said weight distributing hitch assembly, said mounting means being carried on said proximal end of said elongated body;

a lug integrally formed on a distal end of said elongated body and projecting therefrom so as to rest upon a rigid frame member of said trailer, said lug projecting at an included angle of between substantially 45°–135°; and a retaining tab provided adjacent an end of said lug.

5. The spring bar set forth in claim 4, wherein said mounting means is a trunnion.

6. The spring bar set forth in claim 4, wherein said lug extends in a first plane and said retaining tab extends in a second plane substantially perpendicular to said first plane.

7. A spring bar for a weight distributing hitch assembly utilized to tow a trailer behind a towing vehicle, comprising:

an integral, one-piece elongated body and projecting lug defining an included angle of between substantially 45°–135°, said lug further including a retaining tab adjacent an end of said lug; and a bearing surface on said lug for engaging and resting upon a rigid frame member of the trailer.

8. The spring bar set forth in claim 7 further including means for mounting said spring bar to a ball mount head of said weight distributing hitch assembly, said mounting means being carried on said proximal end of said elongated body.

9. The spring bar set forth in claim 7, wherein said integral, one-piece elongated body and projecting lug have a substantially L-shape.

10. The spring bar set forth in claim 7, wherein said lug extends in a first plane and said retaining tab extends in a second plane substantially perpendicular to said first plane.

\* \* \* \* \*